United States Patent [19]
Rolander

[11] Patent Number: 5,993,638
[45] Date of Patent: Nov. 30, 1999

[54] METHOD FOR OBTAINING WELL-DEFINED EDGE RADII ON CUTTING TOOL INSERTS IN COMBINATION WITH A HIGH SURFACE FINISH OVER THE WHOLE INSERT BY ELECTROPOLISHING TECHNIQUE

[75] Inventor: Ulf Rolander, Stockholm, Sweden

[73] Assignee: Sandvik AB, Sandviken, Sweden

[21] Appl. No.: 08/862,242

[22] Filed: May 23, 1997

[51] Int. Cl.⁶ ..................................................... B23H 3/00
[52] U.S. Cl. ........................................... 205/664; 205/684
[58] Field of Search ..................................... 205/640, 664, 205/674, 684

[56] References Cited

U.S. PATENT DOCUMENTS

| | | | |
|---|---|---|---|
| 4,217,190 | 8/1980 | Neal et al. | 204/129.35 |
| 4,405,422 | 9/1983 | Blomsterberg | 204/129.85 |
| 4,411,751 | 10/1983 | Blomsterberg | 204/129.85 |
| 5,334,294 | 8/1994 | Iwai et al. | 204/129.55 |
| 5,380,408 | 1/1995 | Svensson | 204/129.1 |
| 5,591,320 | 1/1997 | Rolander | 205/655 |

FOREIGN PATENT DOCUMENTS

| | | |
|---|---|---|
| 445305 | 9/1991 | European Pat. Off. . |
| 936871 | 9/1963 | United Kingdom . |

OTHER PUBLICATIONS

Dialog Information Services, File 351, World Patent Index 81–97, Dialog accession no. 004628367, WPI accession no. 86–131710/21, Muller K.: "Anodic Reconditioning of Cutting Tools in Sulphuric Acid Electrolyte Contg. Hydrogen Peroxide and Non–Ionogenic Wetting Agent"; & DD,A, 232168, 860122, 8621 (Basic).

Dialog Information Services, File 351, World Patent Index, 81–97, Dialog accession no. 009186167, WPI accession no. 95–313604/38, Showa Denko KK: "Cemented Carbide Base Mfr. for Depositing Diamond Films—Comprising Blending Acicular Crystals of e.g. Carbide(s), Nitride(s), Sintering, Formed Protrusions by Polishing Sintering and Scratching Surface"; & JP,A,4221075, 920811, 9238 (Basic).

Dialog Information Services, File 351, World Patent Index 81–97, Dialog accession no. 004447684, WPI accession no. 85–274562/44, Medinstrument Prod et al: "Electrolyte for Electrochemical Sharpening of Cutting Tools Contains Sulphuric and Phosphoric Acid, Water and Additional Triethanolamine Sulpho–Salicylic Acid and Glycerine"; SU,A, 1151399, 850423, 8544 (Basic).

*Primary Examiner*—Kathryn Gorgos
*Assistant Examiner*—Thomas H Parsons
*Attorney, Agent, or Firm*—Burns, Doane, Swecker, & Mathis, L.L.P.

[57] ABSTRACT

There is disclosed a method for edge rounding of cutting tool inserts, in combination with a high surface finish over the whole insert, of cemented carbide or titanium-based carbonitride alloys. An electrolytic method is used with an electrolyte which provides an even removal of both binder phase and hard constituent phases. The electrolyte comprises perchloric ($HClO_4$) or sulphuric ($H_2SO_4$) acid, in amounts >15 and <50 volume %, in methanol or other suitable organic liquid. The method is easier to control than conventional mechanical methods and is particularly useful for providing very small edge radii of about 10 $\mu$m in combination with a high surface finish over the whole insert which cannot be made by mechanical or other electrolytic methods.

9 Claims, 1 Drawing Sheet

METHOD FOR OBTAINING WELL-DEFINED EDGE RADII ON CUTTING TOOL INSERTS IN COMBINATION WITH A HIGH SURFACE FINISH OVER THE WHOLE INSERT BY ELECTROPOLISHING TECHNIQUE

BACKGROUND OF THE INVENTION

The present invention relates to a method for obtaining well-defined edge radii on cutting tool inserts in combination with a high surface finish over the whole insert by electropolishing technique.

Inserts for chip forming machining made of cemented carbide or of titanium-based carbonitride (cermet) have at least one main cutting edge and a connecting nose (corner). Such inserts are produced by the powder metallurgical methods of milling of powders of the hard constituents and binder phase, pressing to bodies of desired shape and finally sintering the pressed bodies. The pressing is generally done as tool pressing between two opposing punches in a die. As a result of the pressing operation, the inserts obtain rather sharp edges. In addition, because of the small gap, a few microns wide, that always exists between the punches and the die wall, the insert edges also have burrs. Such edges break too easily when used.

Therefore, after sintering, the inserts are subjected to an edge rounding operation including mechanical methods such as lapping, tumbling, brushing or blasting. These operations, however, are difficult to control with any desirable accuracy. For this reason, the edge rounding values usually range between 30 and 75 $\mu$m on cemented carbide inserts for a majority of machining applications. Smaller edge rounding values are generally not possible to obtain with mechanical methods. Also, the edges often get defects in the initial stage of the mechanical operation. These defects disappear during the continued treatment provided that the final edge rounding obtained is larger than the defect size.

A finer edge rounding, however, means lower cutting forces. The choice of edge rounding is a compromise between desired edge strength and acceptable cutting forces. For certain cutting operations such as threading and machining of heat resistant materials, aluminum or cast iron, lower cutting forces are desirable. However, the above-mentioned methods for edge rounding are generally not useful at least on a large, industrial scale.

Electrolytic smoothing or deburring is a commonly employed technique. Two well-known processes are called electrochemical deburring and electropolishing. U.S. Pat. No. 4,405,422 discloses methods for electrolytic deburring of copper or copper alloys and U.S. Pat. No. 4,411,751 of steel or aluminum alloys. However, when subjecting materials with phases of differing chemical properties such as cemented carbide to chemical treatments, the binder phase is often dissolved first, resulting in a porous surface layer with reduced strength and often containing portions comprising several grains that have disappeared (so-called pitting). It is therefore essential that an electrolyte is used which provides an even removal of material, essentially without depth effect. An example of this is U.S. Pat. No. 5,380,408 which discloses a method for removing cobalt from the surface of cemented carbide using an electrolyte of sulphuric and phosphoric acids. This method, however, does not generate edge rounding.

In U.S. Pat. No. 5,591,320, a method for edge rounding of cutting inserts by electropolishing in an electrolyte containing 2–15 volume % perchloric (HClO$_4$) or sulphuric (H$_2$SO$_4$) acid in methanol is presented. With this method, for geometrical reasons, the material removal is significantly larger along an edge than on an essentially flat surface resulting in an excellent fine edge rounding whereas the polishing effect is smaller on essentially flat surfaces. However, on such surfaces there often appear spots in which, due to unstable conditions, Co is preferentially etched away. The surface finish after this treatment is also generally not good enough for the inserts to be coated directly by CVD- or PVD methods or to be delivered to the customer. Additional mechanical or chemical treatment is needed. This further treatment can lead to an enlargement of the desired fine edge radius.

OBJECTS AND SUMMARY OF THE INVENTION

It is an object of this invention to avoid or alleviate the problems of the prior art.

It is an object of the present invention to provide a method for edge rounding of cutting tool inserts, which can be more carefully controlled, in combination with a high surface finish over the whole insert.

It is a further object of the present invention to provide a method of manufacturing inserts with a small edge radius of the order of 10 $\mu$m in combination with a high surface finish over the whole insert.

It is an aspect of the invention to provide a method for edge rounding in combination with a high surface finish over the whole insert of cemented carbide or titanium-based carbonitride alloys of cutting tools comprising:

providing an electrolyte of greater than 15 and less than 50 volume % perchloric (HClO$_4$) or sulphuric (H$_2$SO$_4$) acid, or a mixture thereof, in an organic liquid carrier;

submerging said inserts into the electrolyte;

providing an electrode of an acid resistant material within the electrolyte;

applying an electrical potential between the inserts (anode) and the electrode (cathode) for a period of time sufficient to round the edges of said inserts to a desired degree while also providing a high surface finish over the whole insert.

DETAILED DESCRIPTION OF THE PREFERRED EMBODIMENTS OF THE INVENTION

Figure 1:
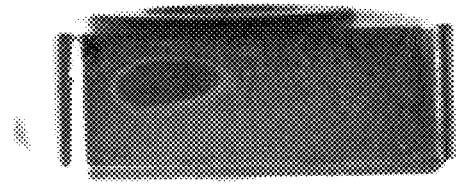
FIG. 1 shows in 5× the clearance face of an insert treated according to prior art.

It has now surprisingly been found that by using a method similar to the one disclosed in U.S. Pat. No. 5,591,320, but using an electrolyte comprising perchloric (HClO$_4$) or sulphuric (H$_2$SO$_4$) acid in higher concentrations, an even removal of the burr and rounding of the edge is obtained, resulting in a smooth edge with an edge rounding which is essentially constant around the insert in combination with a high surface finish over the whole insert. The method is easier to control than conventional mechanical methods and is particularly useful for providing very small edge radii of about 10 μm in combination with a high surface finish over the whole insert which cannot be made by mechanical methods.

According to the present invention, the inserts are thoroughly cleaned, e.g., by ultrasonic cleaning in methanol so that dust, loose particles, grease stains etc., that may affect the polishing result are removed from the surfaces. The inserts are then submerged in the electrolytic bath and a voltage is applied between the inserts (anode) and a cathode. Strong agitation is carried out in order to obtain stable conditions with electrolyte flowing along all sides of the inserts. The cathode should be made of an acid resistant material, e.g., platinum or acid resistant stainless steel, and have a surface area comparable to or preferably larger than the total surface area of the inserts.

The electrolyte shall contain >15 but <50 volume %, preferably 20–30 volume % perchloric ($HClO_4$) or sulphuric ($H_2SO_4$) acid, or a mixture thereof, in methanol. Methanol may be partly or fully substituted by more viscous fluids, e.g., another lower alcohol such as butanol or glycerol or ethyleneglycol-monobutylether, in order to decrease the polishing speed or as a means for obtaining more stable conditions.

The temperature of the electrolyte may be varied between room temperature and −60° C., mainly in order to change the viscosity of the electrolyte.

The voltage shall be lower than 50 V but higher than 3 V, preferably 10–30 V. Generally a DC-voltage is used. But it is also possible to use pulsed or AC-voltage. The proper choice of voltage depends on the design of the equipment used, the degree of agitation obtained and the choice of electrolyte and temperature.

The choice of electrolyte, temperature, applied voltage and Apolishing time should be adapted for each insert grade to obtain the best result. It is within the purview of the skilled artisan to determine these conditions.

Immediately afterwards the inserts are rinsed, e.g., in methanol, in order to avoid corrosion caused by the electrolyte.

With a correct choice of the different parameters described above, a thin, highly viscous layer is formed at the interface between insert and electrolyte. Since the voltage drop occurs mainly across this layer, the polishing speed will depend strongly on its thickness. Therefore, on a rough surface, protruding parts will be polished faster than grooves, leading to a continuously decreasing surface roughness. On the other hand, if the choice of parameters is too far from the optimum, the viscous layer will never be formed or will be unstable, leading to oxidation or even pitting of the surface.

The method is suitable for mass production since large quantities of inserts can be polished simultaneously with high polishing speed. The accuracy and reproducibility is extremely high.

Edge defects due to pressing or grinding will decrease in size or even vanish depending on the size relation between defect and final edge radius.

For geometrical reasons, the material removal rate is substantially larger along the edges than on the flat surfaces of the insert. Thus, the method can be used also for gradient sintered grades, i.e., grades with a binder phase enriched surface layer, without risking that the gradient is removed.

The invention is additionally illustrated in connection with the following Examples which are to be considered as illustrative of the present invention. It should be understood, however, that the invention is not limited to the specific details of the Examples.

EXAMPLE 1

A commercially available cemented carbide insert (SANDVIK H10F) with as-sintered sharp edges with remaining burr was electropolished for 6 minutes using an electrolyte of 22 volume % sulphuric acid in methanol, cooled to −50° C., and a DC-voltage of 20 volts. A 30 $cm^2$ platinum sheet was used as cathode and the electrolyte was stirred strongly using a magnetic mixer. Smooth rounded edges were obtained with small edge radii about 20 μm and excellent surface finish.

For comparison a similar insert was treated according to U.S. Pat. No. 5,591,320.

Figure 2:
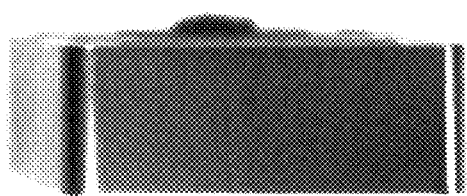
FIG. 2 shows in 5× the clearance face of an insert treated according to the invention.

In FIG. 1, a clearance face is shown from the insert treated as disclosed in U.S. Pat. No. 5,591,320, and in FIG. 2, treated according to the invention.

Figure 3:
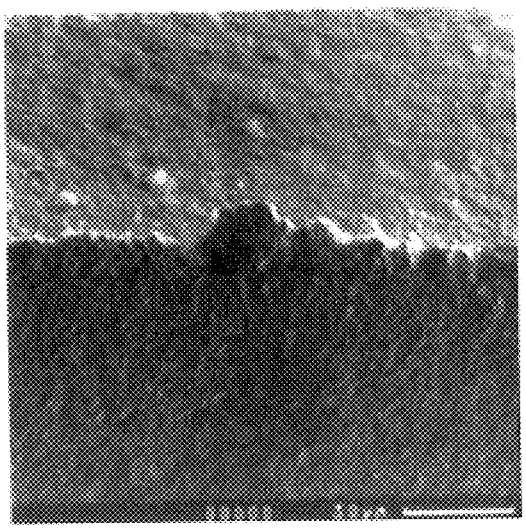
FIG. 3 shows in 500× an edge of an insert with burr.
Figure 4:
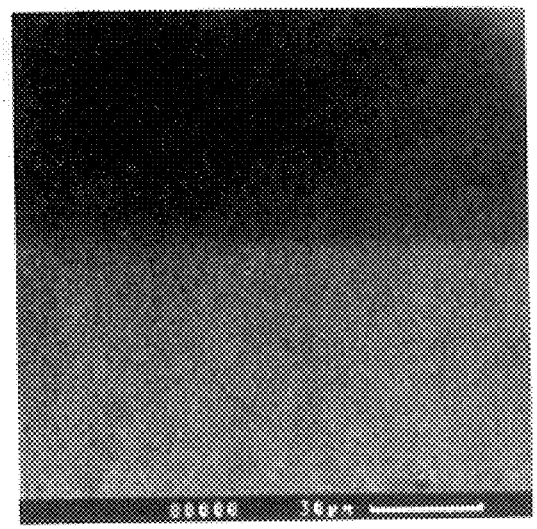
FIG. 4 shows in 500× an edge after rounding according to the invention.

FIG. 3 shows an edge with remaining burr and FIG. 4, after treatment according to the invention.

EXAMPLE 2

Example 1 was repeated, but with a shorter polishing time of 4 minutes. Smooth, rounded edges were obtained with small edge radii about 10 μm and excellent surface finish.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method for edge rounding in combination with a high surface finish over the whole insert of cemented carbide or titanium-based carbonitride alloys of cutting tools comprising:

providing an electrolyte of greater than 15 and less than 50 volume % perchloric ($HClO_4$) or sulphuric ($H_2SO_4$) acid, or a mixture thereof, in an organic liquid carrier;

submerging said inserts into the electrolyte;

providing an electrode of an acid resistant material within the electrolyte;

applying an electrical potential between the inserts which act as anodes and the electrode which act as a cathode for a period of time sufficient to round the edges of said inserts to a desired degree while also providing a high surface finish over the whole insert.

2. The method of claim 1 wherein an edge radii of about 10 μm in combination with a high surface finish is obtained.

3. The method of claim 1 wherein the organic liquid carrier comprises a lower alcohol.

4. The method of claim 3 wherein the organic liquid carrier comprises a methanol.

5. The method of claim 1 wherein the electrode is made of platinum.

6. The method of claim 1 wherein the electrode is made of an acid resistant stainless steel.

7. The method of claim 1 wherein the electrical potential is applied at a voltage of above 3 but less than 50 volts.

8. The method of claim 7 wherein the electrical potential is applied at a voltage of 10–30 volts.

9. The method of claim 1 wherein the electrolyte contains 20–30 volume % perchloric or sulphuric acid or a mixture thereof.

* * * * *